(No Model.) 2 Sheets—Sheet 1.

O. ZWIETUSCH.
BEER FILTER.

No. 402,500. Patented Apr. 30, 1889.

Witnesses:
Chas. E. Gaylord.
M. J. Bowers

Inventor:
Otto Zwietusch,
By Dyrenforth and Dyrenforth,
Att'ys.

(No Model.) 2 Sheets—Sheet 2.

O. ZWIETUSCH.
BEER FILTER.

No. 402,500. Patented Apr. 30, 1889.

Witnesses:
Chas. L. Gaylord.
M. J. Bowers.

Inventor:
Otto Zwietusch
By Dyrenforth and Dyrenforth
Attys.

UNITED STATES PATENT OFFICE.

OTTO ZWIETUSCH, OF MILWAUKEE, WISCONSIN.

BEER-FILTER.

SPECIFICATION forming part of Letters Patent No. 402,500, dated April 30, 1889.

Application filed August 22, 1888. Serial No. 283,466. (No model.)

*To all whom it may concern:*

Be it known that I, OTTO ZWIETUSCH, a citizen of the United States, residing at Milwaukee, in the county of Milwaukee and State of Wisconsin, have invented a new and useful Improvement in Beer-Filters, of which the following is a specification.

My invention relates to certain improvements in those parts of beer-filters by which a suitable counter-pressure is maintained and by which air, gas, and foam accumulating in the filters are expelled therefrom; and its nature will be readily understood from the subjoined description in connection with the accompanying drawings, in which—

Figure 1:
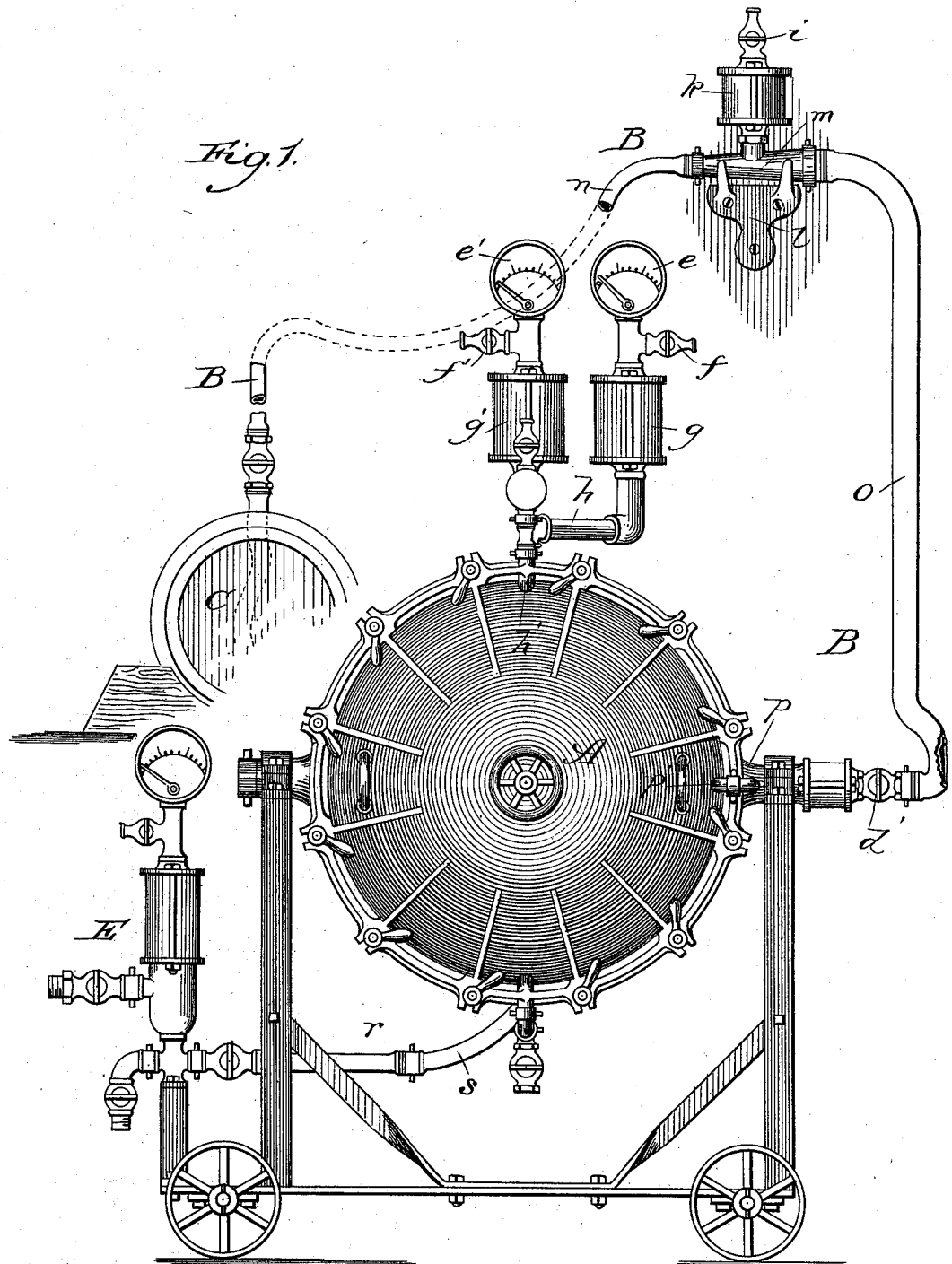
Figure 3:
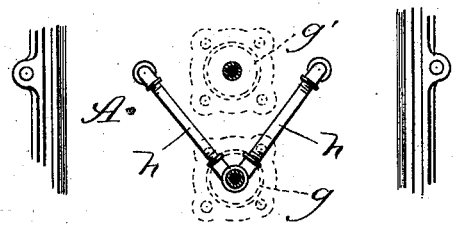
Figure 2:
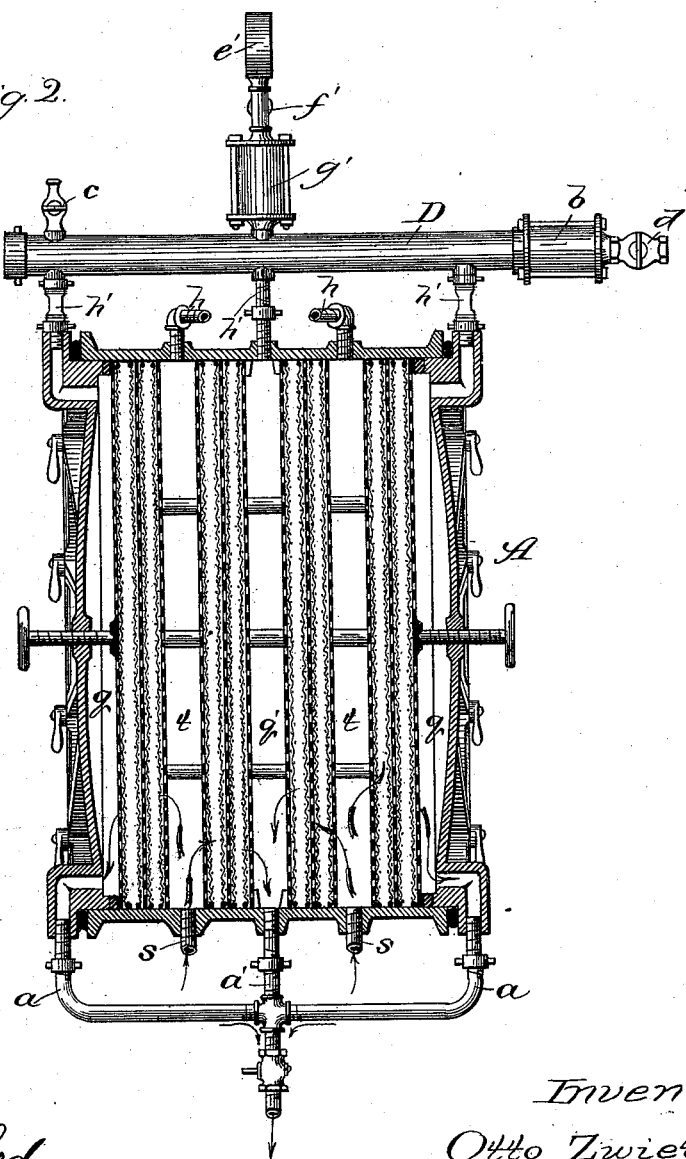

Figure 1 is a side elevation of the filter and attendant parts; Fig. 2, a vertical cross-section of the filter, and Fig. 3 a plan view of a portion of the filter with certain parts removed.

A is a filter to which the features constituting my present improvements are applied.

The particular filter shown in the drawings forms the subject of a separate application for a patent now pending, (Serial No. 269,009, filed March 30, 1888,) and will be only generally described here, especially since the feature by which the counter-pressure is regulated is equally applicable to all filters, and those features by which the air, gas, and foam are expelled are applicable wholly or in part to all filters having a plurality of inlet-chambers or of outlet-chambers, or of both.

In the filter represented in the drawings there are two inlet-chambers, $t\ t$, for the unfiltered product, which enters those chambers through branches $s\ s$ of the conduit $r$, and three outlet-chambers, $q\ q\ q^2$, for the filtered product, which is discharged from those chambers through outlets $p\ p'$, leading into the discharge-conduit B.

In the filtration of beer as practiced by me the liquid is forced from the storage-cask into the filter under a pressure higher than the pressure to which the liquid is charged, and in order to prevent foaming its progress to and through the filter is resisted by a counter-pressure properly not less than the gaseous pressure in the liquid. Thus, to illustrate, if the beer in the storage-cask is charged to a pressure of six pounds, the counter-pressure, to secure the best results, should not go below six pounds, but should rather exceed that pressure, though of course it must be below the pressure at which the beer emerges from the filter, since otherwise the flow would either cease or retrograde, depending upon whether the counter-pressure equaled or exceeded the progressive impelling force.

It will readily be seen that the counter-pressure regulated, as above explained, to exceed slightly or at least equal the gaseous pressure in the liquid operates to retain the gas within the liquid in the same manner that the impelling pressure of compressed air introduced into the storage-cask upon the surface of the liquid at a pressure exceeding that of the imprisoned gas retains the latter within the liquid. In other words, the beer is carried from the storage-vessel through the filter and into the ultimate receptacle between two opposing forces, of which the impelling force exceeds the resisting force, and the latter, to secure fully the benefits of the process, at least equals, and preferably exceeds, the pressure of gas in the liquid.

The requisite counter-pressure may be obtained in various ways. I prefer to obtain it either by means of an aeriform fluid under pressure impeding the progress of the beer or by such a construction and arrangement of the final discharge-conduit as will afford the necessary resistance to the advancing liquid. It is to the last-named form of counter-pressure mechanism that my present improvement relates; and it consists in carrying the discharge-conduit from the outlet-valve of the filter upward to a sufficient altitude and then downward, terminating in a discharge-valve, to which is attached the usual membranous tube for filling the ultimate receptacle, and having the ascending portion of greater diameter than the descending portion, and having the outlet-valve at the filter of larger discharging capacity than the valve at the terminus of the descending portion of the discharge-conduit; also, in employing with this construction a tapering connection between the ascending and descending portions, whereby the diminution is gradual instead of abrupt, and also in combining with the supported discharge-conduit constructed as above a controllable vent at the highest point.

In the drawings, o is the ascending portion of the conduit B, which should have an altitude in feet approximately equal to double the number of pounds of gas-pressure in the beer, and which leads from the discharge-valve $d'$ at the filter; $n$, the descending portion thereof, less in diameter than the part o and terminating in the discharge-valve $d^2$, of smaller discharging capacity than the discharge-valve $d'$; $m$, the tapering connection between the two, suitably supported, as by a bracket, $l$; $k$, the receptacle surmounting the conduit at the turn and communicating with its interior, and $i$ a stop-cock on the receptacle forming a controllable outlet for the air, gas, and foam. The tapering connection is employed because, if the diminution is abrupt, the sudden obstruction to the flowing liquid is liable to excite foaming. The ultimate receptacle C may be regarded as resting upon the same floor with the filter, though this is not material.

The function of the device just described will be clear from the following explanation:

If the beer is bunged at six pounds pressure, which is usual, a counter-pressure of from six to seven pounds at the outlet of the filter becomes necessary to prevent the disengaging of the gas, as before explained. If the gaseous pressure in the beer is about seven pounds, the counter-pressure should be from seven to eight pounds, and so on. A pressure of from two pounds to four pounds is required to force the liquid through the filtering material, and hence ordinarily a pressure of from ten to twelve pounds is requisite at the inlet-chamber.

With a filter having a one-and-one-half-inch inlet and a one-inch outlet and with an impelling pressure of from ten to twelve pounds, to obtain the requisite counter-pressure of seven pounds or eight pounds by friction, one hundred and fifty feet of hose of one inch diameter would be required were the hose disposed horizontally, while if a vertical pipe is used, discharged from its upper end, fifteen feet will suffice, the vertical pipe when filled acting as a hydrostatic column. Where, however, as in my discharge-pipe, the discharge is not from the upper end of the vertical portion, but the pipe turns downward from the highest point, discharging at a lower level, the pressure of the hydrostatic column in the ascending part will be diminished as long as the flow continues after the highest point has been passed in proportion to the length of the descending part. If the horizontally-disposed hose be used, there is no counter-pressure at first upon opening the outlet, and the requisite counter-pressure is not obtained until the entire one hundred and fifty feet of hose have been filled. During this entire period gas will be disengaged, as the liquid is subjected to a counter-pressure lower than its own gaseous pressure. Furthermore, until the requisite counter-pressure is obtained the outflow from the filter will be greater than the amount of liquid filtered, causing a lowering of the level of the liquid in the filter toward the outlet-pipe, and hence a partial vacuum, and this partial vacuum serves to disengage a still larger amount of gas than that liberated by the lack of counter-pressure at the beginning of the operation. My improvement overcomes the above difficulties. The vertically-disposed portion of the discharge-pipe is rapidly filled, so that the requisite counter-pressure is obtained speedily and the lowering of the level of the liquid in the filter at the beginning of the operation is prevented.

The advantages of my improvement are not confined to the beginning of the operation, however. Thus suppose one cask to have been emptied. Then the usual floating ball in the device E will close the inlet-valve, and in case the one hundred and fifty feet of horizontal hose were attached to the filter the level of the liquid in the filter would fall and cause foaming, as above described. Then, when the liquid from the succeeding cask should again release the floating ball, the action in the case of the one hundred and fifty feet of hose would be the same as originally described. With my improved device, however, upon the shutting of the floating-ball valve, the hydrostatic column will still remain, preventing the filter from emptying, as it would do in the other case, and maintaining in the filter the requisite counter-pressure in readiness for the next succeeding cask of liquid to be filtered.

The smaller descending pipe terminating in the smaller valve is used, so that it may never empty the larger ascending pipe. There is always more liquid present in the larger ascending pipe than can pass off by the descending pipe.

Even though the counter-pressure be properly regulated, more or less separation of gas from the beer in the filter and discharge-conduit, with consequent foaming, is liable to occur in the beginning of the operation. In addition to this there is always air in the filter and connections at this stage, and the air, gas, and foam must be allowed to escape. The separation of gas in the initial stage may in a great measure be abated by first filling the filter with compressed air from the air-reservoir employed in racking, and then letting this air off gradually to admit the beer, as described in my pending applications for Letters Patent, No. 260,472, filed January 12, 1888, and No. 269,009, filed March 30, 1888; but a slight separation is liable to occur nevertheless, yielding free gas and foam. To permit the expulsion of the air, gas, and foam contained within the filter, as above, the several chambers are provided at their highest points with controllable outlets, with or without the interposition of receptacles, as shown and described in my other pending applications above referred to.

One part of my present invention relates to certain improvements in these features, as follows: Instead of providing each inlet and outlet chamber with a separate outlet-cock or outlet-cocks and interposed receptacle, I provide a common receptacle and controllable vent for all the inlet-chambers and a common receptacle and controllable vent for all the outlet-chambers. As shown in the drawings, $h\ h$ are the outlet-pipes leading from the tops of the inlet-chambers and converging to a common receiver, $g$, surmounted by an outlet-cock, $f$, and pressure-gage $e$, and preferably transparent. The receiver may be omitted, if desired.

From the several outlet-chambers pipes $h'$ lead into a common receiver, D, in the form of a tube, parallel, or nearly so, with the top of the filter, and provided at one end with a controllable discharge, $d$, and at or near the opposite end with a controllable outlet, $c$. At any suitable position in the tube D, but preferably at the discharge end, as shown, is a glass section, $b$. The tube D is surmounted by a pressure-gage, $e'$, which may, if desired, surmount a receiver, $g'$, and outlet-cock $f'$. These features may, if desired, be employed also in connection with an aeriform counter-pressure.

The construction above described of the final discharge-conduit B is simple and is very effective in creating and maintaining the requisite counter-pressure. Any air, gas, and foam which may collect in the conduit B will attain the highest point, and may be detected and expelled by means of the receiver $k$ and cock $i$.

The operation of the common receiver and controllable outlet on the inlet-chambers needs no further explanation; but the operation of the common receiver and attendant parts on the outlet-chambers is less obvious, and a brief explanation of the latter is as follows: At the beginning of the operation the beer which passes through the filter is not usually in proper condition to be sent into the ultimate receptacles, and this first beer is allowed to flow off by way of the cock $d$ into a separate vessel, and any air, gas, and foam which may accumulate are let off by means of the cock or cocks on the tube D. When an inspection of the beer through the glass section $b$ shows it to be in proper condition the cock $d$ is closed and the cock $d'$ in the conduit B is opened, thus diverting the flow into the ultimate receptacles. The effect, so far as the process is concerned, would be the same if the flow to the ultimate receptacles took place by way of the tube D; but it is more convenient to have separate outlets for the rejected beer and that which is satisfactory, since this obviates the need of coupling and uncoupling the connections.

E represents a device for permitting the condition of the beer to be observed before it enters the filter. It also permits air, gas, and foam to be expelled and permits the flow of beer to be diverted from the filter, if desired. It is fully explained and its novel features are claimed in a separate application for a patent by me, No. 260,473, filed January 12, 1888, now pending.

The pipes $a$ and $a'$ are drainage-pipes.

What I claim as new, and desire to secure by Letters Patent, is—

1. In combination with an apparatus for filtering gaseous liquids under pressure, provided with a discharge-valve, $d'$, the discharge-conduit B, comprising the ascending part $o$, leading from the valve $b'$, and the descending part $n$, of smaller diameter than the part $o$ and terminating in a discharge-valve, $d^2$, of smaller discharging capacity than the valve $d'$, substantially as described.

2. In combination with a beer-filter having a discharge-valve, $d'$, the discharge-conduit B, comprising the part $o$, leading from the valve $d'$, and part $n$, of smaller diameter than the part $o$ and terminating in a discharge-valve, $d^2$, of smaller discharging capacity than the valve $d'$, and intermediate tapering connection, $m$, substantially as described.

3. In combination with a beer-filter having a discharge-valve, $d'$, the discharge-conduit B, comprising the ascending part $o$, leading from the valve $d'$, descending part $n$, of smaller diameter than the part $o$ and terminating in a discharge-valve, $d^2$, of smaller discharging capacity than the valve $d'$, and a controllable vent upon the highest part of the discharge-conduit, substantially as described.

4. The combination, with a filter, A, having a discharge-valve, $d'$, of the discharge-conduit B, supported as at $l$, and comprising the ascending part $o$, leading from the valve $d'$, descending part $n$, of smaller diameter than the part $o$ and terminating in a discharge-valve, $d^2$, of smaller discharging capacity than the valve $d'$, and the tapering connection $m$, provided with a controllable vent, substantially as described.

5. In combination with a beer-filter having a plurality of inlet-chambers each interposed between two filtering strata and two outlet-chambers, as set forth, pipes $h\ h$, leading from the tops of the several inlet-chambers and converging together and terminating in a single controllable vent common to all, substantially as described.

6. The combination, with a beer-filter having a plurality of outlet-chambers, of a tube, D, above the filter, having a discharge-cock, $d$, at one end, transparent section $b$, and a controllable vent, and pipes $h'$, connecting the tube D with the upper parts of the several outlet-chambers, substantially as described.

7. The combination, with a beer-filter having a plurality of outlet-chambers, of a tube, D, above the filter, having a discharge-cock, $d$, at one end, a transparent section, $b$, a controllable vent and a pressure-gage, and pipes $h'$, connecting the tube D with the upper parts of the several outlet-chambers, substantially as described.

8. The combination, with a beer-filter having a plurality of outlet-chambers, of the tube D, having the discharge-cock $d$, transparent section $b$, and vent-cock $c$, pipes $h'$, connecting the tube D with the upper parts of the several outlet-chambers, and receiver $g'$, cock $f'$, and pressure-gage $e'$, surmounting the tube D, substantially as described.

OTTO ZWIETUSCH.

In presence of—
EMIL SCHINZ,
MORITZ WITTIG, Jr.